US010776426B1

(12) United States Patent
Danilov et al.

(10) Patent No.: US 10,776,426 B1
(45) Date of Patent: Sep. 15, 2020

(54) CAPACITY MANAGEMENT FOR TREES UNDER MULTI-VERSION CONCURRENCY CONTROL

(71) Applicant: EMC IP Holding Company LLC, Hopkinton, MA (US)

(72) Inventors: Mikhail Danilov, Saint Petersburg (RU); Konstantin Buinov, Lhotka (CZ); Alexander Rakulenko, Seattle, WA (US); Gregory Skripko, Seattle, WA (US); Kirill Zakharov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 252 days.

(21) Appl. No.: 15/582,077

(22) Filed: Apr. 28, 2017

(51) Int. Cl.
*G06F 17/00* (2019.01)
*G06F 16/901* (2019.01)

(52) U.S. Cl.
CPC ................. *G06F 16/9027* (2019.01)

(58) Field of Classification Search
CPC .................................................. G06F 16/9027
See application file for complete search history.

(56) References Cited

U.S. PATENT DOCUMENTS

| | | | | |
|---|---|---|---|---|
| 2009/0204567 A1* | 8/2009 | Barrow | ............... | G06F 17/2247 |
| 2010/0228999 A1* | 9/2010 | Maheshwari | ....... | G06F 21/6218 |
| | | | | 713/189 |
| 2011/0051623 A1* | 3/2011 | Johnson | .................. | H04L 41/12 |
| | | | | 370/254 |
| 2011/0060718 A1* | 3/2011 | You | ........................ | G06F 16/284 |
| | | | | 707/600 |
| 2011/0131389 A1* | 6/2011 | Gremaud | ................ | G06F 8/656 |
| | | | | 711/206 |
| 2011/0313548 A1* | 12/2011 | Taylor | ................. | G06F 16/9535 |
| | | | | 700/47 |
| 2012/0239664 A1* | 9/2012 | Shinjo | ................. | G06F 16/9027 |
| | | | | 707/745 |

(Continued)

FOREIGN PATENT DOCUMENTS

RU     2015139057     3/2017

OTHER PUBLICATIONS

Fu et al., Unbalanced tree-formed verification data for trusted platforms. https://onlinelibrary.wiley.com/doi/abs/10.1002/sec.1385 (Year: 2015).*

*Primary Examiner* — Syed H Hasan
(74) *Attorney, Agent, or Firm* — Womble Bond Dickinson (US) LLP

(57) ABSTRACT

Capacity management is provided for a plurality of search trees under multi-version concurrency control. A non-volatile memory includes a plurality of chunks that are fixed-sized blocks of the non-volatile memory, each chunk including at least one page. The non-volatile memory stores the plurality of search trees, each search tree having elements including a tree root, a tree node and a tree leaf. Each element of the tree is at a different level of the search tree: a first level including the tree root, a second level including the tree node, and a third level including the tree leaf. The plurality of chunks includes a number of chunk types, each chunk type for storing the element from a different level of the search tree, such that elements from different levels are stored in separate chunks.

17 Claims, 5 Drawing Sheets

(56) References Cited

U.S. PATENT DOCUMENTS

| | | | |
|---|---|---|---|
| 2013/0036143 A1* | 2/2013 | Peng | G06F 16/185 |
| | | | 707/795 |
| 2013/0297877 A1* | 11/2013 | Dennis | G06F 12/0811 |
| | | | 711/122 |
| 2014/0181821 A1* | 6/2014 | Shavit | G06F 9/466 |
| | | | 718/101 |
| 2015/0006466 A1* | 1/2015 | Tonder | G06F 16/2336 |
| | | | 707/602 |
| 2017/0075947 A1* | 3/2017 | Kurilov | G06F 11/14 |
| 2017/0083549 A1* | 3/2017 | Danilov | G06F 16/2329 |
| 2017/0177652 A1* | 6/2017 | Danilov | G06F 3/0608 |

* cited by examiner

US 10,776,426 B1

CAPACITY MANAGEMENT FOR TREES UNDER MULTI-VERSION CONCURRENCY CONTROL

FIELD

The disclosure herein relates generally to data storage systems.

BACKGROUND

Generally, multi-version concurrency control (MVCC) is a technique used by databases and storage systems to provide concurrent access to data. With MVCC, a user of a storage system sees a snapshot of the database at a particular instant in time. One user's changes to the database are not seen by other users until the changes have been completed.

Some data storage systems use search trees (e.g., B+ trees) to provide efficient access to stored data. Distributed storage systems (or "clusters") may manage a large number of search trees, each often having a very large number of elements. The trees maintained are therefore often large and typically a substantial portion of each tree is stored on hard disk drives or other suitable non-volatile memory. The trees are shared by cluster nodes using MVCC.

To provide MVCC with search trees, a storage system may treat elements of a search tree as immutable. Under MVCC, a search tree may be updated by storing the new/updated data to unused portions of disk, and scheduling a tree update. During a tree update, at least one tree element is updated. In the case of a B+ tree, which includes a root node, internal nodes, and leaves, a tree update requires generating a new leaf to store the data, a new root node, and possibly new internal nodes. These new tree elements may be linked with existing tree elements to form a new search tree. Tree updates result in unused tree elements left on disk and, thus, storage systems typically include a process for detecting and reclaiming unused tree elements (referred to as "garbage collection"). When data updates are massive, such trees cause severe hard drive space fragmentation. To address this issue, some modern computer systems are using a copying garbage collector to manage the fragmentation problem. However, the current copying garbage collectors are resource demanding processes.

BRIEF DESCRIPTION OF THE DRAWINGS

The embodiments of the disclosure herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

One aspect of the disclosure herein relates to capacity management that prevents severe fragmentation of non-volatile memory (e.g., hard drive space). In one embodiment, capacity is managed for trees, such as B+ trees, under multi-version concurrency control (MVCC). By virtue of the embodiments disclosed herein, it is possible to provide more efficient garbage collection by the storage system.

Figure 1:
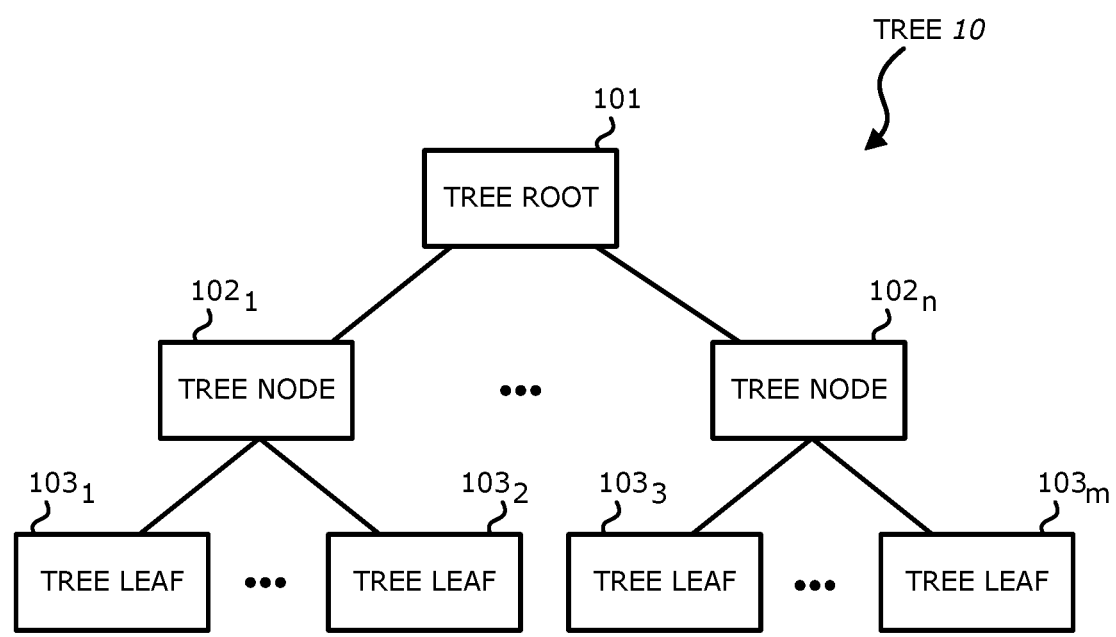
FIG. 1 illustrates a block diagram for explaining an example tree according to an embodiment herein.

FIG. 1 illustrates a block diagram for explaining an example tree according to an embodiment herein. In the embodiment of FIG. 1, tree 10 is a search tree that includes a tree root 101, a plurality of tree nodes 102 $102_1$-$102_n$ (n>1), and a plurality of tree leaves 103 $103_1$-$103_m$ (m>1). Tree root 101, tree nodes 102 $102_1$-$102_n$ and tree leaves 103 $103_1$-$103_m$ are collectively referred to herein as "tree elements". In general, a search tree may include an arbitrary number of tree elements.

Each of the tree nodes $102_1$-$102_n$ include keys and each of the tree leaves $103_1$-$103_m$ include key-value pairs. Accordingly, in order to update tree 10, each tree update requires update of one leaf and N−1 nodes, where N is the current depth of the tree 10. It is noted that under MVCC, a tree update typically involves deletion of an old tree element and creation of a new tree element.

One example of the tree 10 is the B+ tree data structure. In some embodiments, a single cluster manages thousands of trees such as tree 10 because there are multiple system components that use trees to keep or store information, and there are 128 trees used for each information type in order to keep each particular tree at a reasonable size. While the tree 10 may be large, a major part of each tree 10 resides on hard drives or other non-volatile memory.

Figure 2:
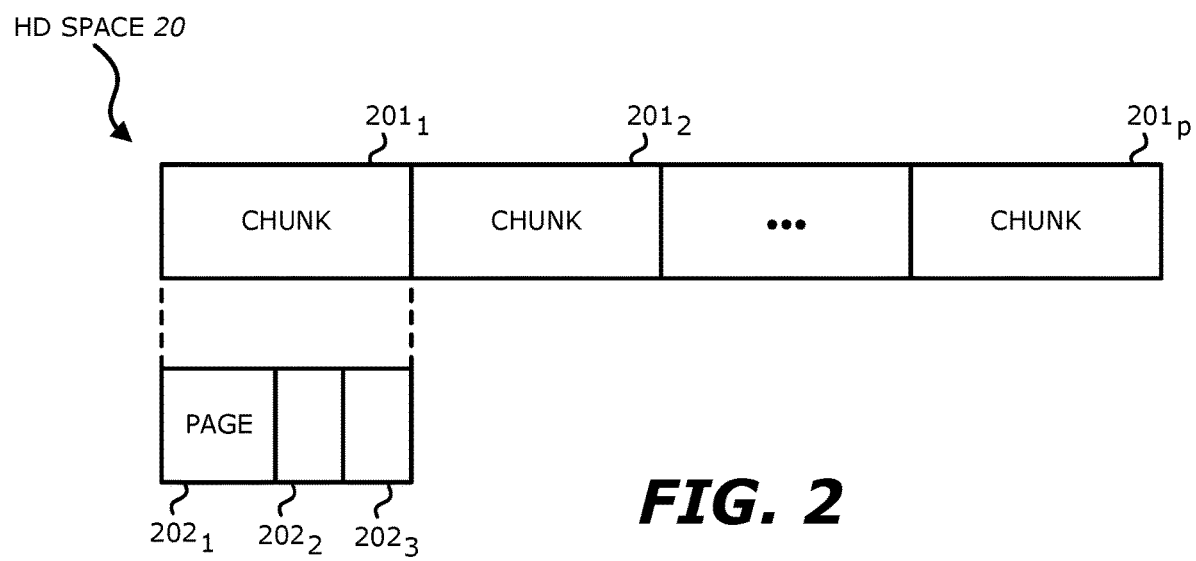
FIG. 2 is a diagram of for explaining an example of a non-volatile memory (e.g., hard drive disk space) according to an embodiment herein.

FIG. 2 is a diagram for explaining an example non-volatile memory according to one example embodiment. As illustrated in FIG. 2, the non-volatile memory may be, as one example, hard drive disk space (HD space) 20. The hard drive disk space 20 is partitioned into a plurality of chunks $201_1$-$201_p$ (p>1). The chunks $201_1$-$201_p$ are set of blocks of fixed size. Each of the chunks $201_1$-$201_p$ includes at least one page $202_1$-$202_3$. Each page $202_1$-$202_3$ occupies continuous space of a single chunk $201_1$. While FIG. 2 illustrates three pages $202_1$-$202_3$ in chunk $201_1$, it is understood that any number of pages may be included in each of the chunks $201_1$-$201_p$. Each tree element (i.e., tree node $102_1$-$102_n$ or tree leaf $103_1$-$103_m$) is stored in a single page. In one embodiment, content stored in a chunk $201_1$-$201_p$ is modified in append-only mode. For example, storage chunks may be modified by appending pages.

Each of chunks $201_1$-$201_p$ may have a lifecycle, also referred to herein as a lifetime, including an empty state, a used state, a sealed state and a garbage state. For example, newly allocated storage chunks are considered to be in an empty state. When the chunk is populated with at least one page (e.g., tree element), it may be considered used. When a chunk $201_1$-$201_p$ becomes sufficiently full, it may be marked as sealed. Content of sealed chunks is immutable such that all pages (e.g., tree elements) in the sealed chunk are immutable. As a result of tree updates, one or more of the tree elements stored by the chunk may become unreferenced. If a sealed storage chunk as no referenced tree elements, it becomes garbage and its storage capacity can be reclaimed.

Therefore, trees 10 are under Multi-Version Concurrency Control policy (MVCC). Each tree 10 update means reallocation of at least N pages (N>0), where N is the current depth of the tree 10. In particular, tree root 101 changes after each update.

Given that sealed chunks are immutable, fine-grained reclamation of unused hard drive capacity (storage) cannot be implemented. Capacity reclamation is therefore implemented at the chunk level, rather than the page level.

In some embodiments, there are groups of trees 10. Each tree 10 can belong to only one group. Trees 10 inside one group can share chunks $201_1$-$201_p$. In other words, one chunk $201_1$ can contain elements of different trees 10 from one group.

Figure 3:
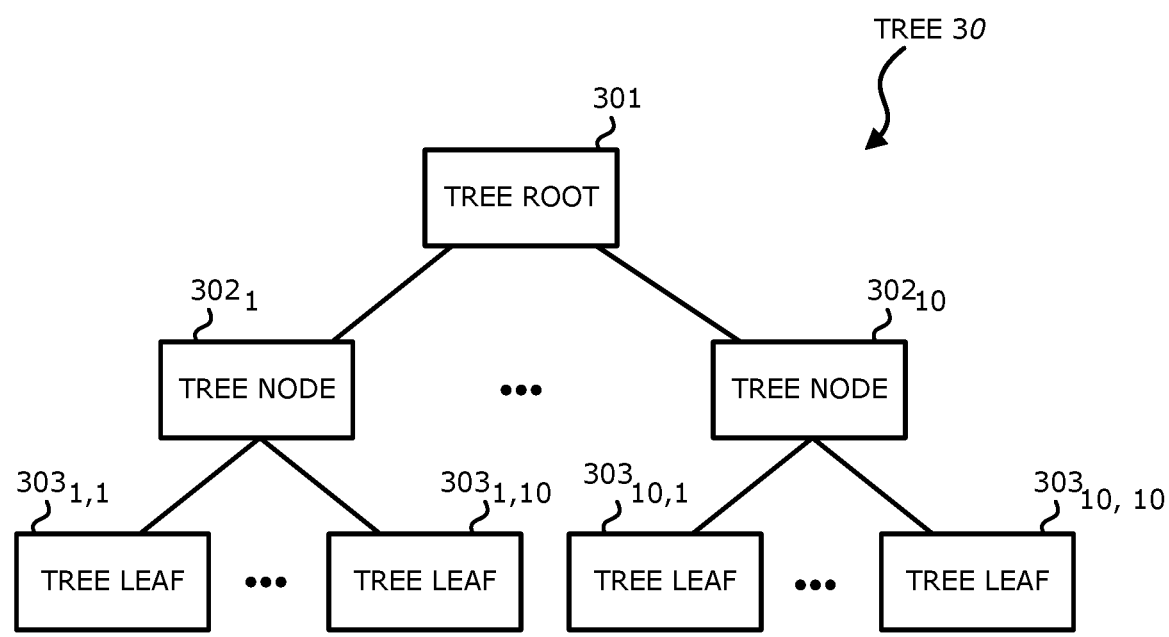
FIG. 3 illustrates a block diagram for explaining an example tree according to an embodiment herein.

FIG. 3 illustrates a search tree 30 which is one example of tree 10 illustrated in FIG. 1. In the embodiment of FIG. 3, tree 30 includes tree root 301, tree nodes $302_1$-$302_{10}$, and tree leaves $303_{1,1}$-$303_{1,10}$-$303_{10,1}$-$303_{10,10}$. Thus, tree root 301 and tree nodes $302_1$-$302_{10}$, each have 10 subordinates. Tree 10 may therefore be considered to have three levels, namely a root level (referred to herein as L1), a node level (referred to herein as L2), and a leaf level (referred to herein as L3).

The average lifetime of tree leaves $103_1$-$103_m$ and tree nodes $102_1$-$102_n$ at different levels (e.g., L1, L2, L3) of tree 10 under MVCC may vary significantly. As noted above, each root 301 and node $302_1$-$302_{10}$ has 10 subordinates. Assuming the probability of a leaf being updated at the L3 level is:

$$P_{L3}=0.1 \quad \text{(equation 1)},$$

then the probability of a node being updated at the level L2 is calculated as follows:

$$P_{L2}=1-(1-P_{L3})^{10}=1-0.9^{10}\approx 0.65 \quad \text{(equation 2)}.$$

Thus, in this embodiment, the probability of a level L2 node update is 6.5 times higher than the probability of a leaf update. Similarly, the probability of a root being updated at the L1 level is calculated as follows:

$$P_{L1}=1-(1-P_{L2})^{10}=1-0.35^{10}\approx 0.99997 \quad \text{(equation 3)}.$$

That is, the probability of a root update is close to 1. Thus, the probability of an update decreases going down tree 30 from the root to a leaf. Accordingly, the expected lifetime of tree elements increases going down tree 30 from the root to a leaf. In particular, the expected lifetime of a tree leaf is relatively long, while the expected lifetime of a tree root is relatively short.

Therefore, from the garbage collection perspective, it may be beneficial to have separate chunks storing tree elements from different tree levels. As one example, the storage system may include three types of chunks, namely a first type of chunk for roots (level L1 tree elements), a second type of chunk for nodes referenced by roots (level L2 tree elements), and so on, and a third type of chunk for leaves (level LN, where N is the depth of the tree). Referring specifically to the embodiment of FIG. 3, the storage system may have at least a first chunk storing root 301, at least a second chunk separate from the first chunk storing nodes $302_1$-$302_{10}$, and at least third chunk separate from the first and second chunks storing leaves $303_{1,1}$-$303_{1,10}$-$303_{10,1}$-$303_{10,10}$. As another example, a storage system includes two types of chunks, namely a first type of chunk for roots and nodes and a second type of chunk for leaves. Referring specifically to the embodiment of FIG. 3, the storage system may have at least one chunk storing root 301 and storing nodes $302_1$-$302_{10}$, and at least one separate chunk storing leaves $303_{1,1}$-$303_{1,10}$-$303_{10,1}$-$303_{10,10}$. The number of types of chunks selected and/or used by the system may depend on real system parameters (e.g., probability of an update, page size, chunk size, etc.).

A substantial part of chunks storing tree roots is released naturally, i.e. without copying of live data, particularly since the rotation speed for these chunks is expected to be quite high (i.e., short lifetime). On the other hand, a substantial part of chunks storing tree leaves will require offloading by a garbage collector (e.g., copying garbage collector).

By virtue of the capacity management processes described herein, a proper initial data layout may be provided with respect to garbage collection by a storage system. In this regard, by way of background, some garbage collectors are based on heuristics and only achieve a beneficial data layout after one or more cycles of garbage collection.

Moreover, by virtue of the capacity management processes described herein, it is possible to provide a storage system which stores potentially long living data in a different area (e.g., chunk set) than data to be deleted shortly. As such, it is possible to reduce the number of garbage collection cycles needed to keep capacity utilization reasonable and reduce the amount of work to be done (data copying) during each particular cycle.

Figure 4:
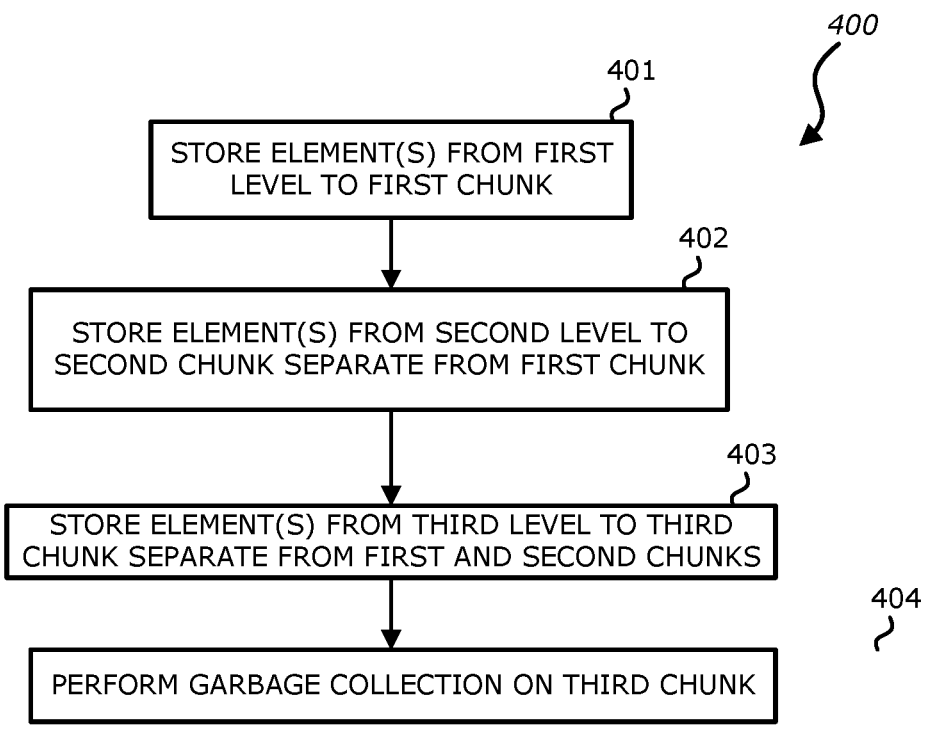
FIG. 4 is a flow diagram for explaining an example process for capacity management according to an embodiment herein.

FIG. 4 is a flow diagram for explaining an example process for capacity management for a search tree under multi-version concurrency control, according to an embodiment herein. In this regard, the following embodiments may be described as a process 400, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 400 may be performed by processing logic that includes hardware (e.g. circuitry, dedicated logic, etc.), software (e.g., embodied on a non-transitory computer readable medium), or a combination thereof.

Referring to FIG. 4, at block 401, the storage system stores elements from a first level of the search tree (e.g., tree root) in a first chunk of the non-volatile memory (e.g, hard-disk drive). At block 402, the storage system stores elements from a second level (e.g., the tree nodes) in a second chunk separate from the first chunk. At block 403, the storage system stores elements in a third level (e.g., the tree leaves) in a third chunk separate from the first chunk and the second chunk. Thus, at blocks 401-403, elements of the search tree are stored on separate chunks of the non-volatile memory (e.g., hard-drive memory) according to search tree level. Of course, it will be appreciated that reference to a chunk herein may include one or more chunks or chunk sets.

At block 404, the storage system may perform a garbage collection process. In one embodiment, garbage collection is performed on chunks storing elements from the third level of the search tree (e.g., tree leaves). In this regard, garbage collection will typically be performed less often on chunks storing elements from the first level (e.g., tree roots) as compared to the third level (e.g., tree leaves), since the expected lifetime of a tree leaf is relatively long as compared to the expected lifetime of a tree root. As such, it is possible to reduce the number of garbage collection cycles needed to keep capacity utilization reasonable and reduce the amount of work to be done (data copying) during each particular cycle.

The embodiment of FIG. 4 involves an example storage system having three types of chunks. However, a similar process for embodiments involving two types of chunks may also be realized.

Figure 5:
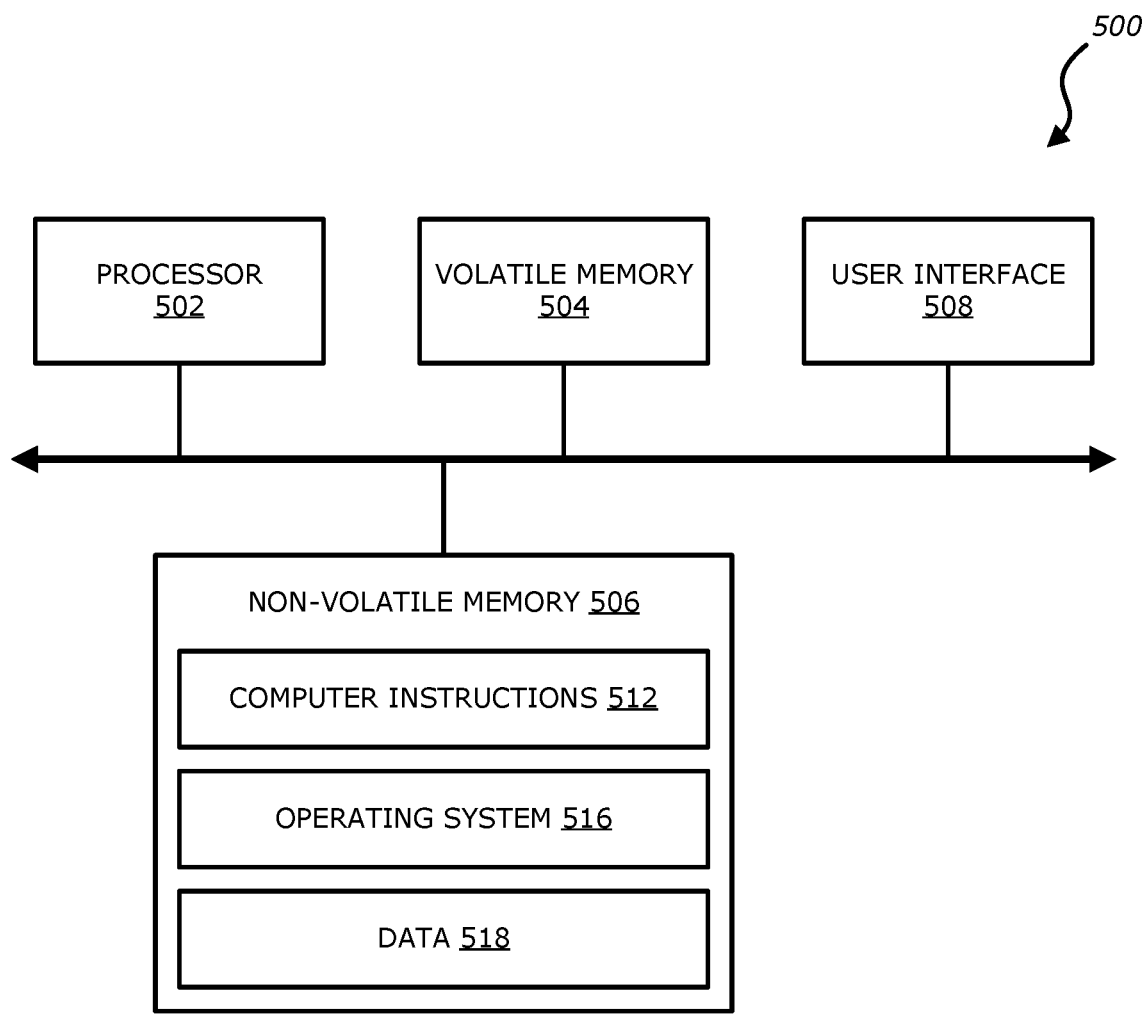
FIG. 5 is a block diagram for explaining an example data processing system on which any portion of the processes disclosed herein may be implemented according to an embodiment herein.

FIG. 5 is a block diagram for explaining an example data processing system on which any portion of the processes disclosed herein may be implemented according to an embodiment herein. For example, system 500 may represent any of data processing systems described above performing any of the processes or methods described above. System 500 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. System 500 may represent a storage system or cluster that allows a client to read and write data (e.g., store new data, update previously stored data). System 500 may represent an object storage system in which data is read and written in the form of objects which are uniquely identified by object IDs. System 500 includes hardware and/or software to provide search tree management, including garbage collection.

Further, while only a single machine or system is illustrated, the term "machine" or "system" shall also be taken to include any collection of machines or systems that individually or jointly execute a set (or multiple sets) of instructions to perform any one or more of the methodologies discussed herein.

System 500 includes a processor 502, a volatile memory 504, a non-volatile memory 506 (e.g., hard disk) and a user interface (UI) 508 (e.g., a graphical user interface, a mouse, a touch pad, a touch sensitive screen, a display, a pointer device such as a stylus, a keyboard, and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 400). In addition, executable code and/or data of a variety of operating systems, device drivers, firmware (e.g., input output basic system or BIOS), and/or applications can be loaded in the memory and executed by processor 502.

In one embodiment, system 500 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 502. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 502, e.g., via a serial peripheral interface (SPI). This flash device may provide for non-volatile storage of system software, including a basic input/output software (BIOS) as well as other firmware of the system.

Processor 502 may represent a single processor or multiple processors with a single processor core or multiple processor cores included therein. Processor 502 may represent one or more general-purpose processors such as a microprocessor, a central processing unit (CPU), or the like. More particularly, processor 502 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 502 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 502, which may be a low power multi-core processor socket such as an ultra-low voltage processor, may act as a main processing unit and central hub for communication with the various components of the system. Such processor can be implemented as a system on chip (SoC).

According to one example embodiment, primary storage 102, object index 111, primary storage backend 112, and client lib 113 are stored in non-volatile memory 506 and are executed by the processor 502 to cause system 500 to function in accordance with the techniques discussed herein.

FIG. 5 is merely one example of a particular implementation and is merely intended to illustrate the types of components that may be present in the system 500. Note that while system 500 is illustrated with various components of a data processing system, it is not intended to represent any particular architecture or manner of interconnecting the components; as such details are not germane to embodiments herein. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 400) are not limited to use with the hardware and software of FIG. 5; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

The processes described herein are not limited to the specific examples described. For example, process 400 is not limited to the specific processing order of FIG. 4. Rather, any of the processing blocks of FIG. 4 may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 400 can be implemented in any combination hardware devices and software components.

Embodiments herein are not described with reference to any particular programming language. It will be appreciated that a variety of programming languages may be used to implement the teachings of embodiments as described herein.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A system for capacity management for a plurality of search trees under multi-version concurrency control, the system comprising:
   a non-volatile memory including a plurality of chunks that are fixed-sized blocks of the non-volatile memory, each chunk including at least one page; and
   a processor coupled to the non-volatile memory,
   wherein the non-volatile memory stores the plurality of search trees, each search tree having elements including a tree root, a tree node and a tree leaf, each element being at a different level of the search tree, a first level including the tree root, a second level including the tree node, and a third level including the tree leaf,
   wherein the plurality of chunks include a number of chunk types, the number of chunk types based on a size of the at least one page, each chunk type for storing elements from one or more different levels of the search tree, such that each chunk type stores elements from different levels as other chunk types,
   wherein the number of chunk types include a first chunk type for storing the tree root at the first level, a second chunk type for storing the tree node at the second level, and a third chunk type for storing the tree leaf at the third level, the tree root having at least two tree leaves connected directly below the tree root, the tree node or the second level comprising a single level.

2. The system of claim 1 wherein the number of chunk types include a first chunk type for storing the tree root or the tree node and a second chunk type for storing the tree leaf.

3. The system of claim 1 wherein the number of chunk types is further based on a probability of an update being performed on the search tree.

4. The system of claim 1 wherein the number of chunk types is further based on a size of one of the plurality of chunks.

5. The system of claim 1 wherein a probability that one of the elements of the search tree will be updated decreases as the search tree is traversed from the first level including the tree root to the third level including the tree leaf.

6. The system of claim 1 wherein a lifetime of one of the elements of the search tree increases as the search tree is traversed from the first level including the tree root to the third level including the tree leaf.

7. The system of claim 1, wherein each of the plurality of search trees is a B+ trees.

8. A method of capacity management for a plurality of search trees under multi-version concurrency control, the method comprising:
   storing a plurality of search trees on a non-volatile memory including a plurality of chunks that are fixed-sized blocks of the non-volatile memory, each chunk including at least one page,
   wherein each search tree has elements including a tree root, a tree node and a tree leaf, each element being at a different level of the search tree, a first level including the tree root, a second level including the tree node, and a third level including the tree leaf,
   wherein the plurality of chunks includes a number of chunk types, the number of chunk types based on a size of the at least one page, each chunk type for storing elements from one or more different levels of the search tree, such that each chunk type stores elements from different levels as other chunk types, and
   wherein the number of chunk types include a first chunk type for storing the tree root at the first level, a second chunk type for storing the tree node at the second level, and a third chunk type for storing the tree leaf at the third level, the tree root having at least two tree leaves connected directly below the tree root, the tree node or the second level comprising a single level.

9. The method of claim 8 wherein the number of chunk types include a first chunk type for storing the tree root and the tree node and a second chunk type for storing the tree leaf.

10. The method of claim 8 wherein the number of chunk types is further based on at least one of a probability of an update being performed on the search tree, and a size of one of the plurality of chunks.

11. The method of claim 8 wherein a probability that one of the elements of the search tree will be updated decreases as the search tree is traversed from the first level including the tree root to the third level including the tree leaf.

12. The method of claim 8 wherein a lifetime of one of the elements of the search tree increases as the search tree is traversed from the first level including the tree root to the third level including the tree leaf.

13. A non-transitory computer-readable storage medium storing computer-executable instructions, the instructions causing a machine to execute a process of capacity management for a plurality of search trees under multi-version concurrency control, the process comprising:
   storing a plurality of search trees on a non-volatile memory including a plurality of chunks that are fixed-sized blocks of the non-volatile memory, each chunk including at least one page,
   wherein each search tree has elements including a tree root, a tree node and a tree leaf, each element being at a different level of the search tree, a first level including the tree root, a second level including the tree node, and a third level including the tree leaf,
   wherein the plurality of chunks includes a number of chunk types, the number of chunk types based on a size of the at least one page, each chunk type for storing elements from one or more different levels of the search tree, such that each chunk type stores elements from different levels as other chunk types, and
   wherein the number of chunk types include a first chunk type for storing the tree root at the first level, a second chunk type for storing the tree node at the second level, and a third chunk type for storing the tree leaf at the third level, the tree root having at least two tree leaves connected directly below the tree root, the tree node or the second level comprising a single level.

14. The non-transitory computer-readable storage medium of claim 13 wherein the number of chunk types include a first chunk type for storing the tree root and the tree node and a second chunk type for storing the tree leaf.

15. The non-transitory computer-readable storage medium of claim 13 wherein the number of chunk types is further based on at least one of a probability of an update being performed on the search tree, and a size of one of the plurality of chunks.

16. The non-transitory computer-readable storage medium of claim 13 wherein a probability that one of the elements of the search tree will be updated decreases going from the first level including the tree root to the third level including the tree leaf.

17. The non-transitory computer-readable storage medium of claim 13 wherein a lifetime of one of the elements of the search tree increases going from the first level including the tree root to the third level including the tree leaf.

* * * * *